(12) United States Patent
Feder et al.

(10) Patent No.: US 9,204,420 B2
(45) Date of Patent: Dec. 1, 2015

(54) QOS-AWARE PAGING IN A WIRELESS COMMUNICATION SYSTEM

(75) Inventors: Peretz Moshe Feder, Englewood, NJ (US); Sureshbabu P Nair, Whippany, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 401 days.

(21) Appl. No.: 11/339,197

(22) Filed: Jan. 25, 2006

(65) Prior Publication Data
US 2007/0171850 A1 Jul. 26, 2007

(51) Int. Cl.
*H04W 68/00* (2009.01)
(52) U.S. Cl.
CPC ..................... *H04W 68/00* (2013.01)
(58) Field of Classification Search
CPC ..................................................... H04W 68/00
USPC ............. 370/311, 229, 335, 395.21; 455/458
See application file for complete search history.

(56) References Cited

U.S. PATENT DOCUMENTS

| | | | | |
|---|---|---|---|---|
| 5,533,094 A * | 7/1996 | Sanmugam | ................ | 455/426.1 |
| 5,894,595 A * | 4/1999 | Foladare et al. | ........... | 455/556.2 |
| 6,510,146 B1 * | 1/2003 | Korpela et al. | ............... | 370/332 |
| 6,731,944 B1 * | 5/2004 | Ostrup et al. | ................ | 455/458 |
| 2002/0059432 A1 * | 5/2002 | Masuda et al. | ................ | 709/227 |
| 2002/0071435 A1 * | 6/2002 | Bolgiano et al. | .............. | 370/394 |
| 2004/0157626 A1 * | 8/2004 | Park et al. | ..................... | 455/458 |
| 2005/0002407 A1 * | 1/2005 | Shaheen et al. | ............... | 370/401 |
| 2005/0272481 A1 * | 12/2005 | Kim | ............... | 455/574 |
| 2006/0009241 A1 * | 1/2006 | Ryu et al. | ..................... | 455/458 |
| 2006/0189331 A1 * | 8/2006 | Lundsjo et al. | ............... | 455/458 |

FOREIGN PATENT DOCUMENTS

| | | | | |
|---|---|---|---|---|
| WO | WO 99/04584 | 1/1999 | ............... | H04Q 7/22 |
| WO | WO 01/89256 | 11/2001 | ............... | H04Q 7/38 |
| WO | WO 2004/073324 | 8/2004 | | |

OTHER PUBLICATIONS

International Search Report, PCT/US2007/000673, (Jan. 11, 2007), 3 pages.

* cited by examiner

*Primary Examiner* — Ariel Balaoing
(74) *Attorney, Agent, or Firm* — Chiesa Shahinian & Giantomasi PC

(57) ABSTRACT

Paging messages are transmitted by a wireless communications network to mobile terminals, which have been in an idle state or dormant mode and which have waiting calls/data from their associated peer entities, in accordance with the qualities of service (QoS) associated with the waiting calls/data, where the QoS associated each waiting call/data includes a type of the call/data. To make paging of mobile terminal QoS aware, a QoS field is included in the Paging Announce requests sent from an RNC to another RNC, or from an RNC to a BTS. The QoS field includes: a QoS class of service of the waiting call/data indicating the type of the waiting call; a grade of service of the waiting call/data to which the mobile terminal is subscribed; and, optionally, other QoS service flow parameters whose presence depends on the type of wireless technology being used in the network.

12 Claims, 5 Drawing Sheets

QOS-AWARE PAGING IN A WIRELESS COMMUNICATION SYSTEM

TECHNICAL FIELD

This invention relates to wireless communications.

BACKGROUND OF THE INVENTION

In current wireless communication systems, a mobile terminal enters an "idle" state or "dormant" mode when, after a communication link has been established with a peer entity, it currently has no data to send and it is receiving no incoming data from the peer entity with which it has been communicating. The peer entity can itself be a mobile terminal or a fixed wired terminal of any type. When the mobile terminal enters the idle state, the active radio link between the mobile and the wireless network is torn down but the network still maintains the ID of the call, the call attributes, and the call session between the peer entity and the mobile terminal continues to remain valid. While in the idle state, the peer entity is not aware that the radio link to the mobile terminal with which it has been communicating is no longer active. The peer entity can thus at any time restart communication, be it voice or data, by transmitting such voice or data. When the peer entity recommences communication, the mobile terminal needs to be awoken from its idle state and reestablish a radio link with the network. In order to "wake" the mobile terminal, the Radio Network Controller (RNC) buffers the incoming call/data from the peer entity and sends a Paging Announce request to the Base Transceiver Stations (BTSs) in the paging group with which the mobile terminal was last associated, which information was conveyed to the network by the mobile before it entered the idle state. The BTSs within the paging group then broadcast a Paging message on a paging channel in order to "wake up" the idle mobile. When the idle mobile terminal, which is listening to the paging channel, "hears" its page, it wakes up and sends a Call Origination request to the network to reestablish the radio connection so that it can thereafter receive the incoming call/data.

The term "BTS" is being used herein to represent the device that terminates the radio interface with the mobile terminal. It is understood that in certain wireless technologies other terms are used, such as base station and cell. As will be used herein in the description and in the claims, the term BTS shall be understood to include any and all essentially equivalent devices that perform such similar functionalities. In a like manner, the term "RNC" is being used herein to represent the device that controls multiple BTSs and provides a common interface to the core network for the BTSs to which it is connected. It is understood that in certain wireless technologies other terms are used, such as gateway and Mobile Switching Center (MSC). In a co-located base station and RNC, these are also referred to as Base Station Routers (BSRs). As will be used herein in the description and in the claims, the term RNC shall be understood to include any and all essentially equivalent devices that perform such similar functionalities.

When the BTS has multiple mobile terminals to page, paging is initiated on a first-come-first-served basis. Disadvantageously, the contention for use of the paging channel on the radio link can have a deleterious affect on the ability to maintain the quality of service that a particular call or data flow should receive.

SUMMARY OF THE INVENTION

In accordance with an embodiment of the present invention, Paging messages are broadcast by the wireless communications network to mobile terminals, which have been in an idle state and which have waiting calls/data from their associated peer entities, in accordance with at least one quality of service parameter associated with the waiting calls/data, where a quality of service parameter associated with the call/data includes a type of the call/data.

In accordance with an embodiment of the present invention, a "quality of service (QoS)" field is included in the Paging Announce requests sent from an RNC to another RNC, or from an RNC to a BTS, to make the paging procedure QoS aware. In an exemplary embodiment, the QoS field includes: a QoS class of service of the call/data that is indicative of the type of the call; a grade of service of the call/data to which the mobile terminal is subscribed; and optionally other QoS service flow parameters depending on the wireless technology in which the embodiment is applied.

Depending on the wireless technology in which an embodiment of the invention is employed, prioritization of the transmission of Paging messages by a BTS to the mobiles connected to that BTS with a waiting call/data is performed either by the RNC using the available QoS information associated with those waiting calls/data, or is performed at the BTS using the QoS information that is contained with each Page Announce message received for those mobile terminals. Paging of a mobile terminal awaiting a call/data flow that is more delay sensitive than another is thus prioritized over the paging of a mobile terminal involved in a less delay-sensitive call/data flow. Thus, for example, paging of a mobile terminal connected in a waiting VoIP call is prioritized over the paging of a mobile terminal connected in a Web browsing session since the latter is less delay sensitive than the former. Using a grade of service as a factor in prioritizing, a page associated with a call/data to a subscriber of an illustrative highest "gold" level of service will be prioritized over a page associated with a call/data to a subscriber of a lower grade of service, illustratively, "silver", or "bronze."

In an embodiment, the Paging message broadcast to the idle mobile terminal to awaken it can contain additional QoS information relating to the waiting call/data that can be used by the mobile terminal to improve the latency in reestablishing the connection. For an embodiment in a system operating in accordance with Wimax IEEE 802.16e standards, for example, the Paging message can indicate a QoS type of call waiting, a CDMA code to be used for the reconnected radio link, and an assigned paging response slot where the latter two parameters are allocated according to the QoS type and, in an embodiment, may be provided only to the higher priority QoS call types.

In an embodiment, using the type of call information in the Paging message associated with the waiting call/data, the mobile terminal is able to send a Call Origination request to the network that requests the setup of a call of the identified type with a requested bandwidth that is needed for the indicated call type, while concurrently internally allocating resources and activating a protocol stack associated with the indicated call type. Advantageously, the overall call-setup time to reestablish the connection is substantially reduced.

BRIEF DESCRIPTION OF THE DRAWING

The present invention will be better understood from reading the following description of non-limiting embodiments, with reference to the attached drawings, wherein below.

DETAILED DESCRIPTION

Figure 1:
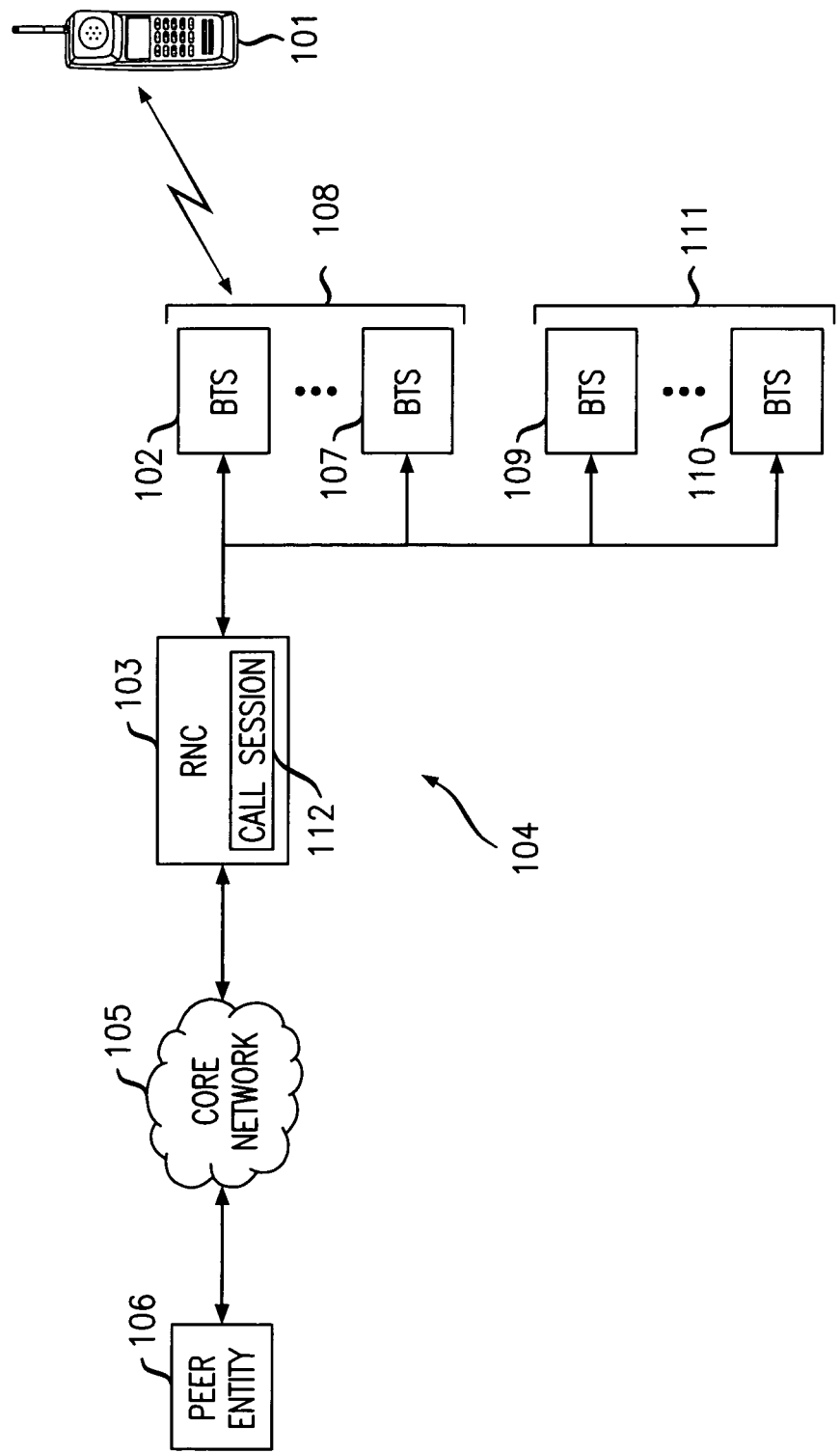
FIG. 1 is a block diagram of a generic prior art wireless communications network in which embodiments of the present invention can be employed.

With reference to FIG. 1, a mobile terminal 101 is communicating in a call session over a radio link through BTS 102 and RNC 103, in wireless communication network 104. RNC 103 is connected through core network 105 to the peer entity 106 with which mobile terminal 101 is in an active call/data session. Mobile terminal 101 can be any type of mobile terminal operating in accordance with particular wireless communication network 104 to which it is connected. For example, wireless network 104 can be a 3G network, a Wimax network operating in accordance with IEEE 802.16e standards, a UMTS network (Revision99, HSDPA, etc.), a 3GPP2 1x-EVDO RevA network, or any other type of wireless communication network. Mobile terminal can be, for example, a cell phone, a PDA, a computer, or any other type of mobile device. Peer entity 106 can be any type of terminal with which mobile terminal 101 can communicate and can be a terminal that is hard wired to a communication network or can itself be a mobile terminal connected to a different wireless network or to the same wireless network 104 to which mobile terminal 101 is connected.

In addition to being connected to BTS 102, RNC 103 is connected to BTS 107 and other BTSs (not shown), which are all within a common paging group 108. RNC 103 is also connected to BTS 109 and BTS 110 and other BTSs (not shown), which are within a different paging group 111. Furthermore, RNC 103 is also connected to other BTSs (not shown), which belong to other paging groups (not shown). Wireless network 104 also includes other RNCs (not shown) to which other BTSs (not shown) within individual paging groups are connected.

When communication ceases during an established connection between mobile terminal 101 and peer entity 106 due to either mobile terminal 101 or peer entity 106 having no current voice or data to transmit to the other, mobile terminal 101 enters an idle state or dormant mode. When mobile terminal 101 enters the idle state or dormant mode, RNC 103 tears the radio link between mobile terminal 101 and BTS 102. Mobile terminal 101 initiates this action by a message sent through BTS 102 to RNC 103, or RNC 103 unilaterally initiates this action in response the absence of any data flow between two endpoints of the connection. RNC 103 may also initiate the action for network management reasons. While mobile terminal 101 is in the idle state or dormant mode, RNC 103 maintains the call session 112 between peer entity 106 and mobile terminal 101.

While it is in the idle state or dormant mode, mobile terminal 101 may remain within the range of BTS 102, or it may move within the range of another BTS, such as BTS 107 within the same paging group 108. It might move, however, into the range of another BTS in another paging group, such as BTS 109 in paging group 111, where the latter BTS is also connected to RNC 103, which is maintaining the call session. When mobile terminal 101 moves into the range of another BTS in another paging group, it reports its association with the new paging group to RNC 103 during a periodic wakeup period. While in the idle state or dormant mode, mobile terminal 101 might also move out of the range of any of the BTSs associated with RNC 103 and into the range of a BTS that is connected to another RNC (not shown). Again, if mobile terminal 101 finds itself under the control of another RNC, it reports its current association to the new RNC, which forwards its association with its new BTS and RNC to the original RNC 103 that is maintaining the session 112.

Regardless of where mobile terminal 101 moves while it is in the idle state or dormant mode, the call session remains active on the original RNC 103, which is holding the call session in an active state. When peer entity 106 restarts transmission of the call/data within the current session, mobile terminal 101 needs to be awoken from its idle state or dormant mode and initiate a Call Origination in order to reestablish a radio link to the network. As in the prior art discussed above, RNC 103 buffers the waiting call/data and sends a Paging Announce request to each of the BTSs within the paging group associated with the last reported location of mobile terminal 101. Thus, if the last reported location of mobile terminal 101 is within its original paging group 108, RNC 103 sends the Paging Announce request to BTS 102, BTS 107 and the other BTSs (not shown) within that paging group. If the last reported location of mobile terminal 101 is within paging group 111, then RNC 103 sends the Paging Announce request to BTS 109, BTS 110 and the other BTSs (not shown) within that paging group. If, however, the last reported location of mobile terminal 101 is within a paging group associated with a different RNC, then RNC 103 sends the Paging Announce request to that new RNC, which in turn sends that Paging Announce request to the BTSs within the paging group associated with the mobile terminal's last reported location in the new RNC's coverage area.

When a BTS receives a Paging Announce request from its associated RNC, it broadcasts a Paging message on a paging channel to wakeup the mobile terminal 101 and alert it of the incoming call/data. In a high traffic area, an RNC is likely to be transmitting many Paging Announce requests to its associated BTSs, each BTS in turn then broadcasting Paging messages to the many mobile terminals needing to be woken from their current idle states or dormant modes. Unlike the prior art, however, where the Paging messages are broadcast by a BTS on a first-come-first-served basis, this embodiment broadcasts its Paging messages on the paging channel based on QoS information associated with the particular call/data sessions needing to be reestablished. Thus, when a BTS has a queue of Paging messages waiting to be broadcast on the paging channel to a plurality of mobile terminals in its area, a Paging message directed to a mobile terminal carrying a high priority and delay-sensitive call/data session will be broadcast before a Paging message directed to a mobile terminal carrying a lower priority and less delay-sensitive call/data session.

What a BTS transmits on the paging channel is controlled by the Paging Function, which can reside either at the RNC or at the BTS, which location is dependent on the particular wireless technology of the wireless network. The Paging Function, regardless of where it resides, has the responsibility of prioritizing the sending of the Paging messages by the BTS for the waiting calls/data according to the QoS call type and grade of service of the waiting calls/data.

Figure 2:
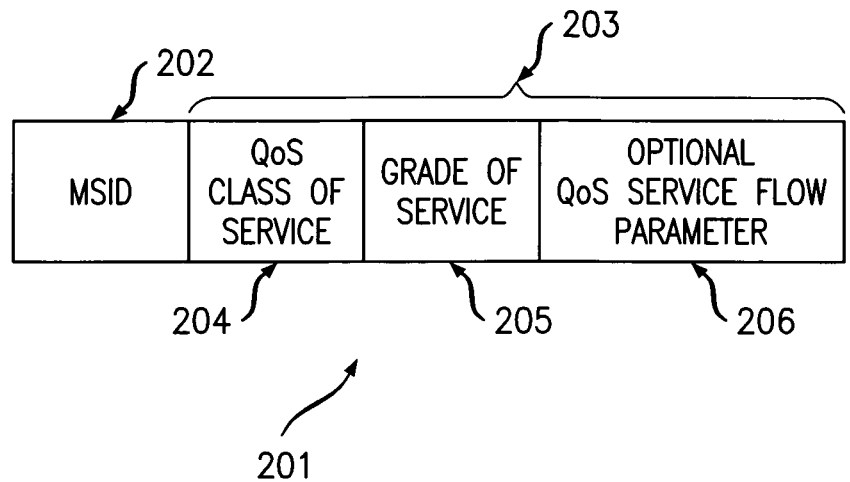
FIG. 2 shows the format of a Paging Announce request that is sent by the RNC to another RNC or to the BTSs in the paging group in which the mobile terminal last reported its location, in accordance with an embodiment of the present invention.

FIG. 2 shows the format of an illustrative Paging Announce request that is sent by an RNC either to another RNC (when the last reported location of the mobile terminal is in the range of a BTS that is connected to a different RNC other than the original RNC that is buffering the incoming call/data) and thence to the BTSs in the paging group of that other RNC that are associated with that last reported location, or directly to the BTSs within the Paging group associated with the last reported location of the mobile terminal if that location is still associated with the original RNC that is maintaining the call session and buffering the incoming call/data. The Paging Announce request 201 includes an MSID (Mobile terminal IDentity) field 202, used to identify the mobile terminal that is to be woken, and a QoS field 203. The QoS field 203 includes a QoS class of service sub-field 204, a grade of service sub-field 205, and a field 206 containing optional QoS service flow parameters. The information in the QoS class of service sub-field 204 indicates the type of the waiting call/data. For example, the field can indicate whether the type of call is a VoIP call, a T1/E1 emulation, voice streaming or video streaming, ftp, web browsing, etc.

In a Wimax wireless network, the information in the QoS class of service sub-field 204 would indicate whether the call is one of the following classes of uplink service, which each have defined attributes: (1) Unsolicited Grant Service (UGS), which is tailored for carrying constant bit-rate real-time services, characterized by fixed-size data packets on a periodic basis, such as for T1/E1 emulation; (2) Real Time Variable Rate (RT-VR), which is designed to meet the needs of real-time-variable-bit-rate-like services characterized by requirements for guaranteed rate and delay, such as for streaming video or audio; (3) Extended Real Time Variable Bit Rate (ERT-VR), which is designed to support real-time service flows that generate variable-size data packets on a periodic basis, such as for VoIP services; (4) Non Real Time Variable Rate (NRT-VR), which is similar to RT-VR except that connections may utilize random access transmit opportunities for sending bandwidth requests and is used for services such as file transfer, such as for ftp, and Internet access that have a minimum guaranteed rate, but can tolerate longer delays and are relatively insensitive to jitter; and (5) Best Effort (BE) service, which is used for services where neither throughput nor delay guarantees are provided, such as for Web browsing. Similar and additional classes of service attributes can be specified for the downlink services.

The information in the grade of service sub-field 205 indicates a grade of service to which the mobile terminal is subscribed for the type of call presently waiting to be connected. For example in a three-grade system, the highest grade of service may be designated as a "gold" level of service, the middle grade of service may be designated as a "silver" level of service, and the lowest grade of service may be designated as a "bronze" level of service, where the higher the grade of service to which a mobile terminal is subscribed, the higher priority that a call/data from and to that mobile terminal is given on the network.

Sub-field 206 is used for optional QoS service flow parameters. The Wimax IEEE 802.16 standard specifies the following QoS service flow parameters for each of the above-described classes: (1) Maximum Sustained Traffic Rate (MSTR); (2) Maximum Latency (ML); (3) Tolerated Jitter (TJ); (4) Request/Transmission Policy (R/TP); (5) Minimum Reserved Traffic Rate (MRTR); and (6) Traffic Priority. Thus, in a Wimax network, these QoS service flow parameters could be specified in sub-field 206.

A BTS generates a Paging message for each received Paging Announce request, which message is transmitted on the paging channel in a designated slot to which the BTS is aware the mobile is listening for an indication to wake up. As noted above, the order in which a BTS broadcasts Paging messages for a queue of waiting calls/data is determined either by the RNC or the BTS itself, and where in the network such prioritization is performed is dependent on where the Paging Function is located, as previously noted. Prioritization of the Paging messages, however, is performed using the QoS class of service parameter specified in sub-field 204, the grade of service parameter specified in sub-field 205, and the QoS service flow parameters specified in sub-field 206, if such latter parameters are included in the Paging Announce request.

Figure 3:
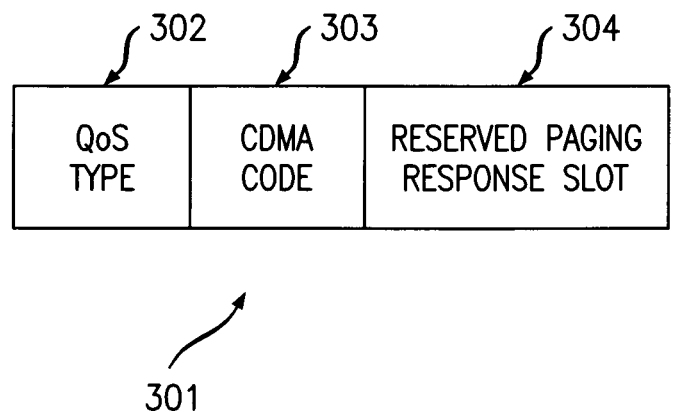
FIG. 3 shows the format of a Paging message that is broadcast by the RNC to the BTSs in the paging group associated with the mobile terminal's last reported location, in accordance with an embodiment of the present invention.

After the prioritization of waiting calls/data at the RNC or BTS, each Paging message that is broadcast by a BTS and directed to a particular mobile terminal is in the format shown in FIG. 3. Unlike the prior art in which a Paging message generally consists of a single bit transmitted on the paging channel in the paging slot on which the mobile terminal to which it is directed is assigned to listen, Paging message 301 is multi-bit including at least one QoS type field 302. The QoS field 302 indicates to the idle or dormant mobile terminal that is being woken up, the type of the waiting call/data, as for example, VoIP, T1/E1, Web browsing, etc., as described above, or UGS, RT-VR, etc. for Wimax embodiments. In addition, for Wimax embodiments, for example, Paging message 301 may also include additional fields 303 and 304. Field 303 contains an assigned CDMA code that the mobile terminal is directed to use in the connection when it is reestablished, and field 304 contains a reserved page response slot for the mobile terminal to use in transmitting a Call Origination request on the System Access channel in reestablishing the connection.

By including a QoS type field in the Paging message, which provides an indication of the waiting call/data type, the mobile terminal is able to internally allocate resources and activate the appropriate protocol stack and enter a communication-ready state faster than it would be if activation of that stack was dependent on receiving a separate message from the network in a message exchange taking place after the mobile terminal has sent an origination request to the network. This reduces the latency in reestablishing the connection to the mobile terminal. Furthermore, in knowing the waiting call/data type, the mobile terminal is able to send a Call Origination request to the BTS and thence the RNC that indicates the waiting call/data type and a request for bandwidth that is needed for that indicated waiting call/data type. Furthermore, in those embodiments in which the Paging message also provides the mobile terminal with a CDMA code to be used, and a page response slot for the mobile terminal to use in transmitting a Call Origination request, the back and forth message exchange between the mobile terminal and the network is avoided that would otherwise be required to set up a radio link. Thus, the latency in forwarding the waiting call/data to the previously idle or dormant mobile terminal is decreased. In a Wimax embodiment, the information in fields 303 and 304, which reserves network resources for the waiting call/data may be used for waiting calls/data having the higher QoS class(es) of service and/or grade(s) of service to avoid usurping limited network resources by waiting calls/data having lower QoS classes of service and/or grades of service.

Figure 4:
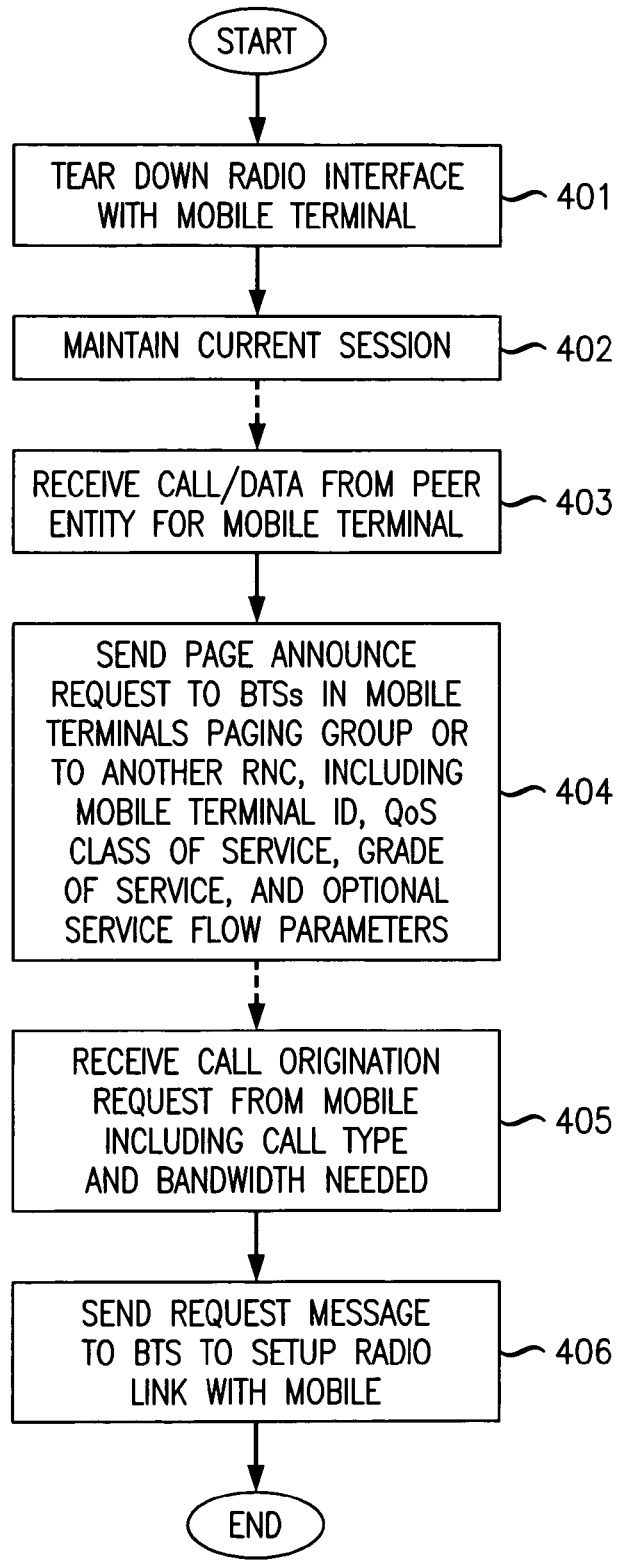
FIG. 4 is a flowchart showing the steps performed by an RNC in accordance with an embodiment of the present invention.
Figure 5:
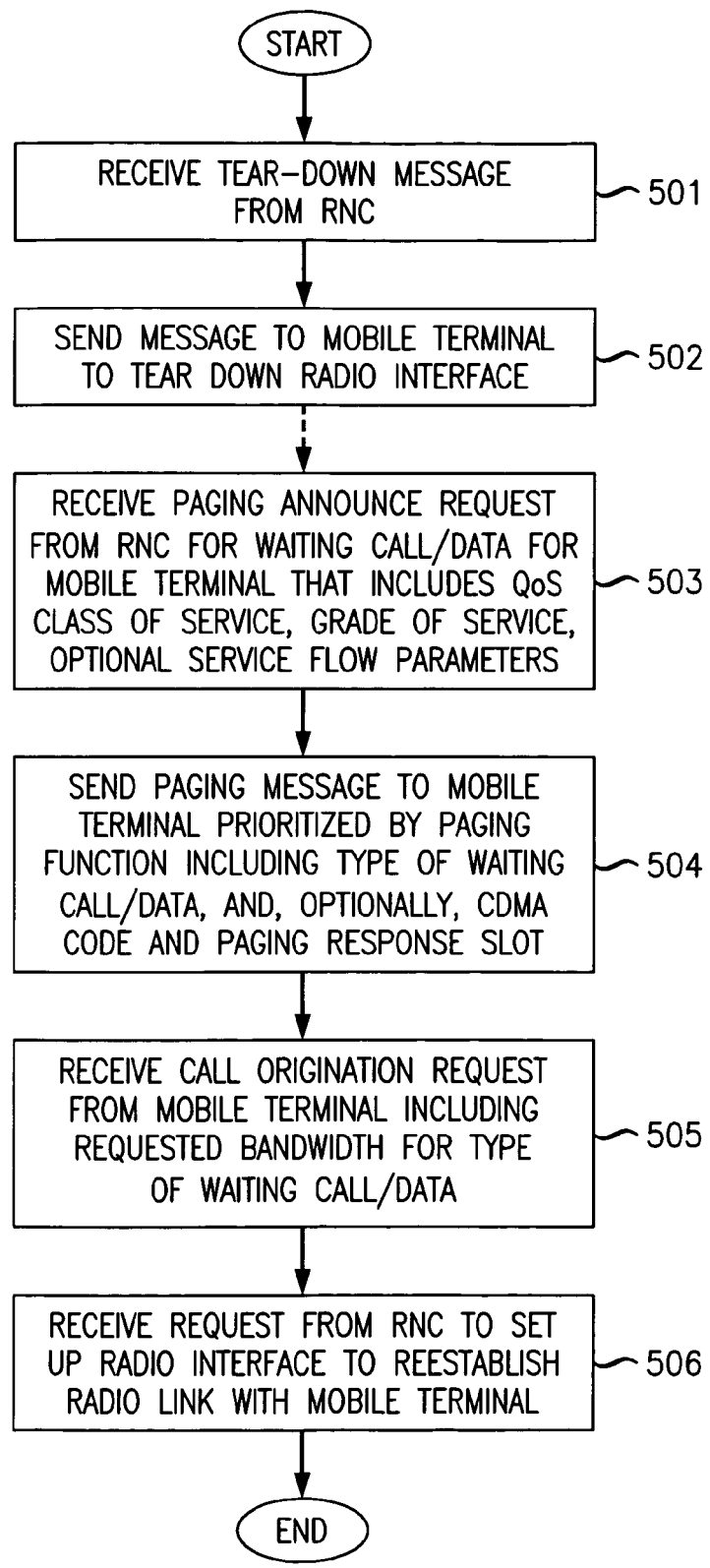
FIG. 5 is a flowchart showing the steps performed by a BTS in accordance with an embodiment of the present invention.
Figure 6:
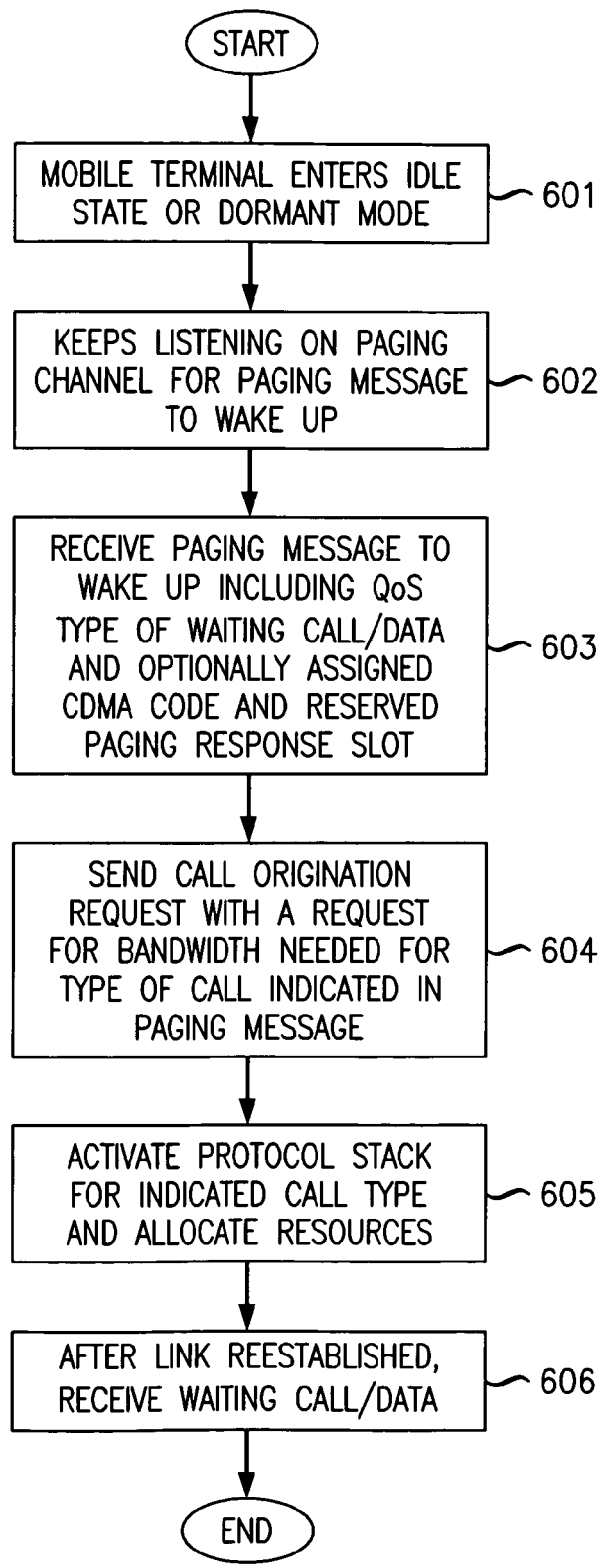
FIG. 6 is a flowchart showing the steps performed by a mobile terminal in accordance with an embodiment of the present invention.

The steps performed by an RNC, a BTS and a mobile terminal in an embodiment of the invention are shown in FIGS. 4, 5 and 6, respectively.

With reference to FIG. 4, at step 401, the RNC tears down the existing radio interface with the mobile terminal. As previously noted, the RNC may do this unilaterally as a result of the lack of data flowing in the connection between the peer entity and the mobile terminal, or for network management reasons. Alternatively, the RNC may receive a message from the mobile terminal to tear down the connection. Once the radio interface has been torn down in step 401, the RNC, in step 402, maintains the idle state/dormant mode information for the current session between the peer entity and the mobile terminal. After the radio interface has been torn down and the mobile terminal has entered the idle state or dormant mode, after some undetermined period of time, at step 403, the RNC receives a call/data from the peer entity for the mobile terminal and buffers that call/data until the mobile terminal to which that call/data is directed has been awoken from its idle state or dormant mode. At step 404, the RNC sends a Page Announce request to the BTSs in the paging group associated with the last reported location of the mobile terminal, or to another RNC if the last reported location of the mobile is associated with a BTS that is connected to a different RNC. The Page Announce request includes the MSID of the mobile terminal, a QoS class of service field that is indicative of the waiting call type, a grade of service field of the subscribed-to service of the mobile terminal, and optional QoS service flow parameters, the latter depending on the embodiment. Depending on where the Paging Function is located, either the RNC or the BTS prioritizes the transmission by the BTS of Paging messages in accordance with the QoS class of service, grade of service associated with each waiting call/data, and the optional QoS service flow parameters, if applicable. At step 405, the RNC receives a Call Origination request from the mobile terminal that includes the call type and the bandwidth needed for that call type, and allocates the bandwidth based on the information in the received Call Origination request. At step 406, the RNC sends a request message to the BTS to set up the radio link with the mobile terminal with the needed bandwidth.

With reference to FIG. 5, at step 501, the BTS receives a message to tear down the radio interface with the mobile terminal from the RNC. At step 502, the BTS sends a message to the mobile terminal and tears down the radio interface. At a later time, at step 503, the BTS receives a Paging Announce request from the RNC for a waiting call/data for that mobile terminal that includes a QoS class of service, a grade of service, and, depending on the embodiment, optional QoS service flow parameters for that waiting call. At step 504, the BTS sends a Paging message to the mobile terminal, which has been prioritized by the Paging Function located at the BTS or the RNC. The Paging message includes a QoS type indicating the type of the waiting call/data and, depending on the embodiment and the type of call/data, a CDMA code for the mobile terminal to use and a reserved paging response slot for the mobile terminal to use for a Call Origination request. At step 505, the BTS receives a Call Origination request from the mobile terminal that includes a requested bandwidth that is going to be needed for the reestablished call/data, which request is forwarded to the RNC. At step 506, the BTS receives a request from the RNC to set up the radio interface so as to reestablish the radio link with the mobile terminal.

With reference to FIG. 6, at step 601, the mobile terminal enters the idle state or dormant mode. At step 602, after entering the idle state or dormant mode, the mobile terminal continues to listen on the paging channel for a Paging message to wake up. At step 603, the mobile terminal receives a Paging message that includes a QoS type, indicating the type of call/data waiting, and optionally for a Wimax implementation, an assigned CDMA code to be used for the reconnection, and a reserved paging response slot to be used for the Call Origination request on the system access channel. At step 604, a Call Origination request is sent on the system access channel on the reserved paging response slot using the assigned CDMA code. Further, the request includes a request for bandwidth needed for the type of the call indicated by the QoS type in the received Paging Message. At step 605, the mobile terminal concurrently allocates resources and activates the protocol stack for the indicated call type. At step 606, after the link has been reestablished, the mobile terminal receives the waiting call/data.

The above-described embodiment is illustrative of the principles of the present invention. Those skilled in the art could devise other embodiments without departing from the spirit and scope of the present invention.

The invention claimed is:

1. In a wireless communication network in which a paging message is transmitted to wakeup an idle or dormant mobile terminal and reestablish a connection of the mobile terminal to the wireless network when a call/data for the idle or dormant mobile terminal is waiting in the network and further wherein a control node in the wireless network maintains an active call session state for a call associated with a given dormant mobile terminal, a method comprising:
   providing at the control node a Quality of Service (QoS) parameter associated with a transmission priority for the active call session, the QoS parameter including at least a service class including an indication of a type of a waiting call/data for the active call session, wherein the type of the waiting call/data is used to determine bandwidth that is needed for the waiting call/data;
   attaching the QoS parameter to a Paging Announce message transmitted from the control node to a base transceiver station (BTS) associated with a paging area for the given dormant mobile terminal; and
   if a plurality of paging messages are waiting to be broadcast from the BTS receiving the Paging Announce message, prioritizing the order in which the plurality of paging messages are transmitted in accordance with the QoS parameter, wherein at least one of plurality of paging messages includes a reserve parameter for reserving network resources for the given dormant mobile terminal to reestablish the connection to the wireless network.

2. The method of claim 1 wherein the QoS parameter further comprises at least one QoS service flow parameter associated with the waiting call/data.

3. The method of claim 1 wherein a paging message to wake up an idle or dormant mobile terminal for a waiting call/data of a type that is more delay sensitive is transmitted before a paging message to wake up an idle or dormant mobile terminal for a waiting call/data of a type that is less delay sensitive.

4. The method of claim 1 wherein a paging message to wake up an idle or dormant mobile terminal that is subscribed to a higher grade of service is transmitted before a paging message to wake up an idle or dormant mobile terminal that is subscribed to a lower grade of service.

5. The method of claim 1 wherein the paging message transmitted to wakeup an idle or dormant mobile terminal further comprises additional information for the mobile terminal to use in reestablishing the connection to the wireless network.

6. The method of claim 5 wherein the additional information comprises a CDMA code for the wireless terminal to use and an assigned paging response slot to use for a call origination message.

7. The method of claim 6 wherein the additional information in the paging message is transmitted only for predetermined types of waiting calls/data.

8. The method of claim 7 wherein the predetermined types of waiting calls/data are calls/data that are the most delay sensitive.

9. In a wireless communication network in which a paging message is transmitted to wakeup an idle or dormant mobile terminal and reestablish a connection of the mobile terminal to the wireless network when a call/data for the idle or dormant mobile terminal is waiting in the network and further wherein a control node in the wireless network maintains an active call session state for a call associated with a given dormant mobile terminal, a method comprising:

providing at the control node a Quality of Service (QoS) parameter associated with a transmission priority for the active call session, the QoS parameter including at least a service class including an indication of a type of a waiting call/data for the active call session, wherein the type of the waiting call/data is used to determine bandwidth that is needed for the waiting call/data; and transmitting a Paging Announce request from the control node to a base transceiver station (BTS) associated with a paging area for the given dormant mobile, the Paging Announce request comprising a field identifying the given dormant mobile terminal and an associated QoS field, the QoS field comprising at least the QoS parameter, wherein an order of a plurality of paging messages is prioritized in accordance with the QoS parameter, at least one of the plurality of paging messages including a reserve parameter for reserving network resources for the given dormant mobile terminal to reestablish the connection to the wireless network.

10. The method of claim 9 wherein the QoS parameter further comprises at least one QoS service flow parameter associated with the waiting call/data.

11. The method of claim 1, wherein the at least one QoS parameter further comprises a grade of service subscribed to by at least some of the associated idle or dormant mobile terminals.

12. The method of claim 9, wherein the QoS parameter further comprises a grade of service that indicates a service level to which the mobile terminal is subscribed.

* * * * *